(12) United States Patent  
Goldsmith

(10) Patent No.: US 8,147,699 B2
(45) Date of Patent: *Apr. 3, 2012

(54) MONOLITH FILTER APPARATUS AND MEMBRANE APPARATUS, AND METHOD USING SAME

(75) Inventor: Robert L. Goldsmith, Wayland, MA (US)

(73) Assignee: HPD, LLC, Plainfield, IL (US)

( * ) Notice: Subject to any disclaimer, the term of this patent is extended or adjusted under 35 U.S.C. 154(b) by 930 days.

This patent is subject to a terminal disclaimer.

(21) Appl. No.: 10/853,976

(22) Filed: May 26, 2004

(65) Prior Publication Data

US 2004/0256321 A1 Dec. 23, 2004

Related U.S. Application Data

(63) Continuation-in-part of application No. 10/261,107, filed on Sep. 30, 2002, now Pat. No. 6,767,455.

(60) Provisional application No. 60/404,944, filed on Aug. 21, 2002.

(51) Int. Cl.
| | |
|---|---|
| *B01D 63/06* | (2006.01) |
| *B01D 61/00* | (2006.01) |
| *B01D 69/04* | (2006.01) |
| *B01D 69/10* | (2006.01) |

(52) U.S. Cl. ........................ 210/650; 210/510.1
(58) Field of Classification Search ............... None
See application file for complete search history.

(56) References Cited

U.S. PATENT DOCUMENTS

| 4,781,831 A | 11/1988 | Goldsmith | 210/247 |
| 5,009,781 A | 4/1991 | Goldsmith | 210/247 |
| 5,108,601 A | 4/1992 | Goldsmith | 210/247 |
| 5,403,479 A * | 4/1995 | Smith et al. | 210/321.69 |
| 5,482,625 A * | 1/1996 | Shimizu et al. | 210/321.84 |
| 5,494,577 A | 2/1996 | Rekers | 210/321.8 |
| 5,707,514 A | 1/1998 | Yamasaki et al. | 210/151 |
| 6,077,436 A | 6/2000 | Rajnik et al. | |
| 6,126,833 A | 10/2000 | Stobbe et al. | 210/650 |

(Continued)

FOREIGN PATENT DOCUMENTS

JP 62181772 8/1987

(Continued)

OTHER PUBLICATIONS

IWA Publishing, London, UK (2002); Stowa Report; H.F. van der Roest; "Membrane Bioreactors for Municipal Wastewater Treatment".

(Continued)

*Primary Examiner* — Krishnan S Menon

(74) *Attorney, Agent, or Firm* — Coats & Bennett, P.L.L.C.

(57) ABSTRACT

A filtration apparatus that separates a liquid feedstock mixed with a gas into filtrate and retentate, the apparatus including at least one filtration device comprised of at least one monolith segment of porous material that defines a plurality of passageways extending longitudinally from a feed face of the structure to a retentate end face. The filtration device contains at least one filtrate conduit within it for carrying filtrate toward a filtrate collection zone, the filtrate conduit providing a path of lower flow resistance than that of alternative flow paths through the porous material of the device. The filtration device can also be utilized as a membrane support for a device for microfiltration, ultrafiltration, nanofiltration, reverse osmosis, or pervaporation. Also disclosed is a method for using such a filtration apparatus.

22 Claims, 5 Drawing Sheets

U.S. PATENT DOCUMENTS

| | | | | |
|---|---|---|---|---|
| 6,284,135 | B1 | 9/2001 | Ookata | 210/220 |
| 2001/0047962 | A1* | 12/2001 | Zha et al. | 210/636 |
| 2002/0081254 | A1 | 6/2002 | Boger | 422/222 |

FOREIGN PATENT DOCUMENTS

| | | |
|---|---|---|
| JP | 4284836 | 10/1992 |
| WO | 00/50156 | 8/2000 |

OTHER PUBLICATIONS

Journal of Membrane Science 221 (2003) 1-35; Z.F. Cui et al. "The use of gas bubbling to enhance membrane processes".

Chemical Engineering Science 56 (2001) 805-812; Johan J. Heiszwolf et al. "Hydrodynamic aspects of the monolith loop reactor".

Chemical Engineering Science 56 (2001) 823-829; T.A. Nijhuis et al.; "Monolithic catalysts as efficient three-phase reactors".

Lecture by dr.ing. Johan J. Heiszwolf et al.; $16^{th}$ International Symposium on Chemical Reaction Engineering (ISCRE 16), Krakow, Poland, Sep. 10-13, 2000; "Monolith Loop Reactor an Alternative to Slurry Reactors".

Journal of Membrane Science 128 (1997) 103-113; M.Mercier et al.; "How slug flow can enhance the ultrafiltration flux in mineral tubular membranes".

Process Biochemistry 37 (2002) 915-920; In-Soung Chang et al.; "Air sparging of a Submerged MBR for municipal wastewater treatment".

NAMS 2002; Nong Xu et al.; "Design and Application of Airlift Membrane-Bioreactor for Municipal Wastewater reclamation"; paper presented at the $13^{th}$ Annual Meeting of the North American Membrane Society (NAMS), May 11-15, 2002, Long Beach, CA.

Biotechnology and Bioengineering, vol. 58, No. 1, Apr. 5, 1998; 47-57; Muriel Mercier et al.; "Yeast Suspension Filtration: Flux Enhancement Using an Upward Gas/Liquid Slug Flow-Application to Continuous Alcoholic Fermentation with Cell Recycle".

AIChE Journal, Mar. 2000 vol. 46, No. 3;pp. 476-488; Muriel Mercier-Bonin et al.; "Hydrodynamics of Slug Flow Applied to Cross-Flow Filtration in Narrow Tubes".

Biotechnology Techniques vol. 9 No. 12 (Dec. 1995) p. 853-858; M.Mercier et al.; "Influence of the Flow Regime on the Efficiency of a Gas-Liquid Two-Phase Medium Filtration".

Biotechnol. Prog. 1998, 14, 680-688; David Leonard et al.; "Novel Membrane Bioreactor with Gas/Liquid Two-Phase Flow for High-Performance Degradation of Phenol".

Journal of Membrane Science 180 (2000) 93-102; M.Mercier-Bonin et al.; "Influence of a gas/liquid two-phase flow on the ultrafiltration and microfiltration performances: case of a ceramic flat sheet membrane".

Water Science & Technology, vol. 41 No. 10-11 pp. 243-250 (2000); X-jFan et al.; "Ultrafiltration of activated sludge with ceramic membranes in a cross-flow membrane bioreactor process" English abstract.

$64^{th}$ Annual Water Industry Engineers and Operator's Conference Sep. 5 and 6, 2001;p. 57-65; Steven Till et al.; "Membrane Bioreactors: Wastewater Treatment Applications to Achieve High Quality Effluent".

Tsinghua Science and Technology ISSN 1007-0214 08/17 pp. 283-287, vol. 5, No. 3, Sep. 2000; Wen Xianghua et al.; "Ceramic Ultra Filtration Membrane Bioreactor for Domestic Wastewater Treatment".

Session 6; Membrane Bioreactors for Wastewater Treatment and Water Reclamation; Helle F. van der Roest; "Applying Membrane Bioreactor Technology for Wastewater Treatment in The Netherlands".

Session 6; Membrane Bioreactors for Wastewater Treatment and Water Reclamation; R.Rhodes Trussell, Ph.D. et al.; "Applying Membrane Bioreactor Technology for Water Reclamation".

Session 6; Membrane Bioreactors for Wastewater Treatment and Water Reclamation; Graham J.G. Juby Ph.D. et al.; "Case Study: Membrane Bioreactor Testing in Seattle, Washington".

Feature Article; A. Fane et al.; pp. 26-35 Jun. 2002; "Membrane Bioreactors: Design & Operational Options".

Journal of Membrane Science 227 (2003) 81-93; Pierre Le Clech et al.; "Critical flux determination by the flux-step method in a submerged membrane bioreactor".

* cited by examiner

MONOLITH FILTER APPARATUS AND MEMBRANE APPARATUS, AND METHOD USING SAME

RELATED CASES

This application is a continuation-in-part of U.S. Ser. No. 10/261,107, filed Sep. 30, 2002 now U.S. Pat. No. 6,767,455, "Airlift Membrane Device and Membrane Bioreactor and Bioreactor Process Containing Same", by Robert L. Goldsmith, which is a utility application claiming priority of provisional application U.S. Ser. No. 60/404,944 filed on Aug. 21, 2002.

The results in Example 1 of this invention were obtained with Government support under the SBIR Phase I Grant DE-FG02-03ER83621 awarded by the Department of Energy. The Government has certain rights in this invention for the application to the removal of catalyst particulates from Fischer-Tropsch catalyst/wax slurries.

BACKGROUND OF THE INVENTION

Filtration and membrane processes for liquid phase separations include cross-flow filtration, microfiltration, ultrafiltration, nanofiltration, and reverse osmosis. Each of these processes can have the filtration rate (membrane flux) reduced by concentration polarization, a phenomenon well known in the liquid-phase membrane field. Historically, the deleterious effects of concentration polarization, mainly flux reduction, have been addressed by pumping a liquid feedstock over a filter or membrane surface at a moderate to high cross-flow velocity. For example, in microfiltration and ultrafiltration processes, typical cross-flow velocities can be in the range of from about 2 m/sec to over 5 m/sec.

Gaslift and Slug Flow Membrane Devices. One alternative to using high cross-flow velocity to control membrane flux is to entrain gas bubbles in the liquid being processed in a gaslift operating mode. A review of gaslift operations can be found in the review article of Z. F. Cui, et al. ("The Use of Gas Bubbling to Enhance Membrane Processes", in J. Mem. Sci. 221 (2003) 1-35). The airlift regime that has been found most beneficial for several membrane configurations is "slug flow", also called Taylor flow. This is especially useful for a membrane device with a well-defined feed flow path, such as a tubular membrane element with flow inside the tube. This may be contrasted with hollow fiber membrane modules with liquid feed on the fiber exterior. Cui, et al. report that using a slug flow membrane device in downflow is more effective than in upflow. Further, Cui, et al., also determined that the best performance was achieved when the slug flow membrane device was actually situated at a 50° angle of inclination.

Several research organizations have worked with slug flow membrane devices, usually tubular membranes. The membrane materials employed have been both polymeric and ceramic. Tests have included both single tubular elements as well as multi-tubular membrane modules. For example, a research group at INSA, Centre de Bioengenierie, Toulouse, France has published extensively on their work with single ceramic tubular membranes, showing the therapeutic effect of operating in the slug flow regime for membrane flux enhancement (M. Mercier, et al., "How Slug Flow Can Enhance the Ultrafiltration Flux in Mineral Tubular Membranes", in J. Mem. Sci. 128 (1997) 103-113; M. Mercier, et al., "Yeast Suspension Filtration: Flux Enhancement Using an Upward Gas/Liquid Slug Flow—Application to Continuous Alcoholic Fermentation with Cell Recycle", in Biotech. and Bioeng., Vol. 58, No. 1, pp. 47-57, Apr. 5, 1998; M. Mercier-Bonin, et al., "Hydrodynamics of Slug Flow Applied to Cross-Flow Filtration in Narrow Tubes", in AIChE Jl., Vol. 46, No. 3, pp. 476-488, March 2002).

A research group at the Nanjing (China) University of Technology has reported on the highly beneficial effect of slug flow for flux enhancement for a tubular membrane bioreactor and suggested the potential applicability to small diameter multichannel membrane devices (N. Xu, et al., "Design and Application of Airlift Membrane-Bioreactor for Municipal Wastewater Reclamation", paper presented at The 13th Annual Meeting of the North American Membrane Society (NAMS), May 11-15, 2002, Long Beach, Calif.

Another research group active in the development and evaluation of slug flow tubular membranes is the School of Water Sciences, Cranfield University (UK). Results of testing with multi-tubular polymeric membrane devices have been published (In-Soung Chang and S. J. Judd, "Air Sparging of a Submerged MBR for Municipal Wastewater Treatment" in Process Biochemistry 37 (2002) 915-920). Tests at Cranfield have used polymeric tubular modules from Milleniumpore (UK) and X-Flow (NL).

Results from extensive pilot tests of many polymeric membranes used in airlift membrane bioreactors for sewage treatment, including X-Flow multi-tubular modules, have been published by DHV Water BV (NL). A report is available from IWA Publishing (H. F. van der Roest, et al., "Membrane Bioreactors for Municipal Wastewater Treatment", IWA Publishing, London, UK (2002)). Results for X-Flow's multi-tubular polymeric membrane modules operated in slug flow are given in pp. 69-83 of this report.

A related patent is U.S. Pat. No. 5,494,577 (Rekers) assigned to Stork Friesland B. V., which discloses an airlift membrane bioreactor that comprises, in part, an airlift multi-tubular membrane device.

All of the above publications show that the use of slug flow involving flowing a mixture of gas and liquid through a membrane device is effective in reducing concentration polarization at the membrane surface during operation, thereby increasing membrane flux. This can be achieved at a liquid cross-flow velocity substantially less than that required to obtain the same membrane flux by solely pumping a liquid feedstock through the membrane device.

Monolith-Based Membrane Devices. Multi-channel monolith membrane devices have been employed in cross-flow membrane separation processes for many years. There are numerous manufacturers of devices, generally of small diameter (<50 cm) and with a relatively few number of channels in the device, typically less than about 50.

Of relevance to the present invention are large-diameter monolith devices that contain one or more "filtrate conduits" within the structure to efficiently extract filtrate from within the structure and convey the filtrate to an external filtrate collection zone. These constructions permit the manufacture of ceramic filtration and membrane modules at substantially reduced costs from those typically available. The monolith-based filter and membrane devices and processes relevant to the present invention, and included herein by reference, include:

1. U.S. Pat. No. 4,781,831 (Goldsmith), which discloses in FIG. 5 therein, and described in the patent Specification, a cluster of individual multiple passageway monoliths arranged to have "filtrate flow conduits" formed by the space among the monolith elements.
2. U.S. Pat. No. 5,009,781 (Goldsmith) and U.S. Pat. No. 5,108,601 (Goldsmith), which disclose therein in the Figures and Specifications unitary monolith structures with filtrate conduits formed within the monoliths.

3. U.S. Pat. No. 6,126,833 (Stobbe, et al.), which discloses structures comprised of an assembly of monolith segments containing both segment internal filtrate conduits and a filtrate conduit arrangement formed by the gap among the monolith segments.
4. U.S. patent application Ser. No. 10/261,107 (Goldsmith) filed Sep. 30, 2002, entitled "Airlift Membrane Device and Membrane Bioreactor and Membrane Bioreactor and Bioreactor Process Containing Same". This application discloses monolith structures with filtrate conduits used in an airlift membrane bioreactor.
5. U.S. patent application Ser. No. 10/812,538 (Goldsmith), Divisional application to Ser. No. 10/261,107.

The present invention embodies the large diameter monolith membrane module structures with filtrate conduits disclosed in the Goldsmith and Stobbe patents and patent applications, and further incorporates modifications to permit gas-liquid flow through the modules, especially in a slug flow mode.

Monolith Loop Reactors. The use of slug flow (gas/liquid) through multi-channel monolith devices has also been employed for catalytic (non-membrane) loop reactors. A research group at the University of Delft (NL) has published information about gas/liquid downflow monolith loop reactors. The downflow Taylor flow mode developed results in very high mass transfer between the liquid, gas and catalyst surface on the monolith passageway walls. (See: J. J. Heiszwolf, et al., "Hydrodynamic Aspects of the Monolith Loop Reactor", Chem. Eng. Sci. 56 (2001) 805-812; T. A. Nijhuis, et al., "Monolith Catalysts as Efficient Three-Phase Reactors", Chem. Eng. Sci. 56 (2001) 823-829; J. Heiszwolf, "The Monolith Loop Reactor an Alternative to Slurry Reactors", presented at ISCRE 16, Krakow (PO), Sep. 12, 2000). The mass transfer mechanism in the Delft monolith loop reactors is like that in slug flow membrane devices. The Delft studies employ a downflow slug flow device rather than the airlift upflow described previously.

Additionally, use of slug flow in catalytic monolith loop reactors has been disclosed by T. R. Boger in the published U.S. patent application 2002/0081254 A1 (Jun. 27, 2002).

For many years, the effectiveness of slug flow in (a) enhancing performance in membrane devices, especially tubular and multi-tubular configurations, and (b) enhancing mass transfer in monolith catalytic reactors has been recognized. Also, for many years, monolith-based membrane devices have been sold commercially. Nevertheless, no one has recognized that the use of large monolith-based membrane devices in the slug flow regime provides a very attractive operating mode in that membrane system complexity and cost can be significantly reduced. This realization is the basis for the present invention.

FIELD OF THE INVENTION

This invention relates to an improved filtration apparatus for separating a mixture of a liquid feedstock and entrained gas bubbles into filtrate and retentate, and more specifically to such a device that utilizes a multiple passageway porous monolith as the filtration device in the apparatus, the monolith having at least one filtrate conduit with low flow resistance that provides enhanced filtrate removal from the interior of the device to a filtrate collection zone external to the filtration device. This invention also relates to an improved membrane apparatus that employs such a filtration device as a membrane support.

SUMMARY OF THE INVENTION

It is therefore an object of this invention to provide an improved filtration apparatus that contains a multiple-passageway, monolithic filtration device that removes filtrate from the device by incorporating at least one filtrate conduit within the monolith structure.

It is a further object of this invention to provide such a filtration device that effectively utilizes most of its passageways by providing a low pressure drop flow path for filtrate between even the innermost passageways and an external filtrate collection zone associated with the device.

It is a further object of this invention to provide such a filtration device that has a large amount of filter surface area relative to the volume of the device.

It is a further object of this invention to provide such an apparatus that has a flux maintenance means consisting of the addition of gas bubbles to the liquid feedstock being filtered so as to have the contained filtration device operate in a slug flow mode.

Yet another object of this invention is to provide an improved membrane filtration apparatus in which a permselective membrane is supported on the surfaces of the passageway walls of the filtration device.

A further object of this invention is to provide a practical design for a filtration apparatus including the filtration device and the necessary means and seals to introduce a liquid feedstock and gas at an apparatus inlet and to withdraw filtrate to a filtrate collection zone and a gas-containing retentate from an apparatus outlet.

This invention results from the realization that the use of monolith structures for filtration devices has certain cost and technical limitations. Small diameter (or other characteristic dimension) monoliths generally need no filtrate conduits to achieve effective filtrate removal, yet are expensive to make, per unit filter area, and to install in housings. Large diameter monoliths can have greatly reduced costs, but require modifications to enhance filtrate removal from the inner passageways of the monolith.

This invention also results from the realization that the addition of entrained air bubbles in a liquid feedstock to be separated by such a monolith device can result in "slug flow" of gas and liquid in the monolith passageways, thereby greatly reducing concentration polarization and reducing the liquid feedstock flow rate required to maintain a high filtration rate.

Finally, this invention results from the realization that it is necessary to utilize such a filtration device in an apparatus suitable for separation of a liquid feedstock into filtrate and retentate.

This invention features a filtration apparatus for receiving a liquid feedstock and a gas and for separating the feedstock into a filtrate and a gas-containing retentate. The apparatus includes at least one inlet for introduction of the feedstock and the gas to a feed end face of a filtration device, the filtration device comprising at least one monolith of porous material. The monolith contains a plurality of passageways extending longitudinally from the feed end face to a retentate end face of the monolith through which the liquid feedstock and gas flow to pass the gas-containing retentate from the device. A filtrate collection zone is located external to the filtration device, and at least one filtrate conduit within the device, isolated from the feed and retentate end faces, carries filtrate toward the filtrate collection zone, the filtrate conduit providing a path of lower flow resistance than that of alternative flow paths through the porous material. At least one outlet from the apparatus is provided for withdrawal of the gas-containing retentate from the outlet end face of the device, and one or more seals are provided to separate the feedstock and the gas-containing retentate from the filtrate collection zone.

In one embodiment of the apparatus, the surface area of the monolith passageway wall surfaces is at least 150 square meters per cubic meter of the monolith.

In another embodiment, the monolith porous material is a ceramic, and the ceramic can be selected from the group consisting of cordierite, alumina, mullite, silica, zirconia, titania, spinel, silicon carbide, silicon nitride, and mixtures thereof.

The porous material of the filtration device has a porosity of at least 30% and a mean pore size of at least 3 microns.

The filtration device of the apparatus can be a single monolith or, alternatively, a monolith assembly.

In one embodiment of the apparatus the filtration device is contained in a housing for filtrate collection and the filtrate collection zone is the annular space between the device and the housing. Alternatively, the filtration device can be sealed along its exterior surface and the filtrate can be withdrawn from at least one end face of the device.

The apparatus can be oriented vertically and the inlet can be at the bottom or at the top of the apparatus.

A permselective membrane of a pore size smaller than that of the porous material can be applied to the passageway wall surfaces of the filtration device. The permselective membrane can be selected from the group of membranes suitable for microfiltration, ultrafiltration, nanofiltration, reverse osmosis, or pervaporation. A microfiltration membrane can have a pore size from about 0.1 to about 1 micron, and an ultrafiltration membrane can have a pore size from about 2 nm to about 0.1 micron.

This invention also features a method for separating a liquid feedstock into a filtrate and gas-containing retentate employing any of the embodiments of the filtration apparatus enumerated above.

BRIEF DESCRIPTION OF THE DRAWINGS

Other objects, features and advantages will occur from the following description of a preferred embodiment and the accompanying drawings, in which.

DESCRIPTION OF THE PREFERRED EMBODIMENTS

Figure 1:
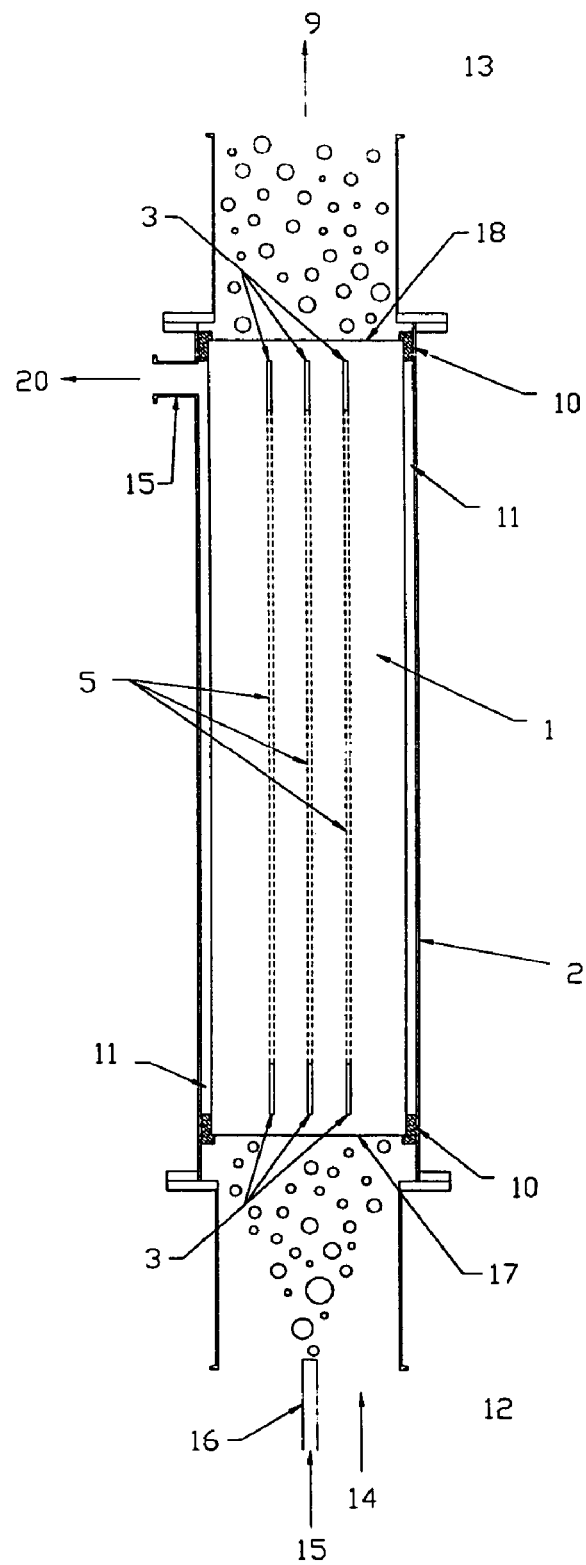
FIG. 1 is a schematic side view of a filtration apparatus and device according to this invention. The filtration device shown is formed from a unitary monolith and three internal filtrate conduits are shown. The apparatus includes the filtration device contained in a housing with end connections and seals, means for liquid and gas introduction at the inlet end, means for removal of a gas-containing retentate at the outlet end, and a filtrate collection zone external to the device. The device and apparatus shown in FIG. 1 are intended for operation in an upflow mode.

In the filtration apparatus of FIG. 1, a multi-channel monolith filtration device 1 is contained within a module housing 2, with means 10 for isolating a filtrate collection zone 11 from a feedstock inlet end 12 and a retentate outlet end 13. The device, as shown, is oriented vertically, with a feed end face 17 at the bottom and a retentate end face 18 at the top. A liquid feedstock 14 is introduced into the feed end face of the device in an upflow mode. A gas stream 15 is introduced co-currently with the liquid feedstock through a sparger 16. The sparger is shown as a tube, but any suitable means of introducing gas as relatively coarse bubbles is satisfactory. At the feed end face the gas bubbles and liquid enter the filtration device passageways and flow upward, preferably in slug flow. The gas-liquid mixture exits the filtration device at the retentate end face 18 and exits the housing 19 through the retentate outlet end.

The filtration device contains at least one internal filtrate conduit. FIG. 1 shows three filtrate conduits, as an example. A preferred structure of the filtrate conduits for a unitary monolith filtration device contains a plurality of filtrate chambers 5 within the monolith which extend along the length of the monolith. The chambers preferably are in the form of one or more rows of monolith passageways. Typically, at least some of the passageways are separated from the filtrate chambers by intervening passageways. This is advantageous in providing a large amount of filtration area per unit volume. At both ends of the device, the filtrate conduit chambers are intersected by one or more transverse channels that communicate between the chambers and a filtrate collection zone disposed along at least one side of the filtration device. The channels are preferably in the form of slots 3, sealed at the ends of the device to prevent entry of feed or retentate material. The filtrate conduit thus consists of the combination of filtrate chambers and channels. Various constructions of the filtrate conduits are disclosed in the afore-mentioned Goldsmith patents (U.S. Pat. No. 4,781,831 U.S. Pat. No. 5,009,781 and U.S. Pat. No. 5,108,601), included herein by reference. The filtrate conduits serve to extract filtrate from the interior of the filtration device and convey the filtrate with a low pressure drop toward an external filtrate collection zone.

A mechanical means is employed at the periphery of the filtration device ends—elastomeric "boots" are shown—to prevent mixing of feed or retentate with filtrate collected in the filtrate collection zone. Other means of sealing, such as O-ring seals and adhesive seals, can also be employed. At least one filtrate port 20 is located on the housing, shown near the outlet end of the apparatus for convenience, to withdraw filtrate.

For the multi-segment membrane module structures disclosed in U.S. Pat. No. 6,126,833, the filtrate conduit structure consists of the above-described intra-segment structure within at least one monolith segment as well as an inter-segment filtrate conduit structure defined by the space among the monolith segments.

In operation, the feedstock liquid and sparged gas are introduced at the inlet end of the apparatus, admixed or separately, and the retentate, a gas-liquid mixture, is removed from the apparatus at the outlet end. The gas introduced at the inlet end, preferably as relatively coarse bubbles—normally larger than the monolith passageway hydraulic diameter, will break up at the feed end face of the filtration device into smaller bubbles and flow up the passageways with the liquid feedstock in slug flow. Depending on device characteristics and operating conditions, a portion of the gas may be removed with the filtrate. Further, gas flow can be continuous or discontinuous, that is pulsatile.

The driving force to create feedstock liquid-gas flow through the filtration device can be achieved by pumping the liquid feedstock into the apparatus and injecting gas near the inlet end face, for example. Alternatively, the liquid feedstock can be circulated without a pump if a liquid feedstock hydrostatic head is applied at the inlet end, this hydrostatic head being greater than the combined hydrostatic head within the filtration device and frictional head loss caused by the gas-liquid flow through the device. More specifically, if the apparatus is submerged in a tank containing the liquid feedstock and gas is sparged into the bottom of the apparatus, the buoyancy of the gas-liquid mixture within the filtration device passageways, relative to the surrounding liquid feedstock, will create a natural convection circulation flow. This will be the case also for a device mounted outside the tank in an external gas-lift configuration.

The filtrate is withdrawn under a positive transmembrane pressure. If the feedstock within the membrane element is at or near atmospheric pressure, the filtrate will be withdrawn under a partial vacuum, typically with a pump. Alternatively, the feedstock can be pressurized above the filtrate pressure, and the filtrate can be removed at or above atmospheric pressure.

Figure 2:
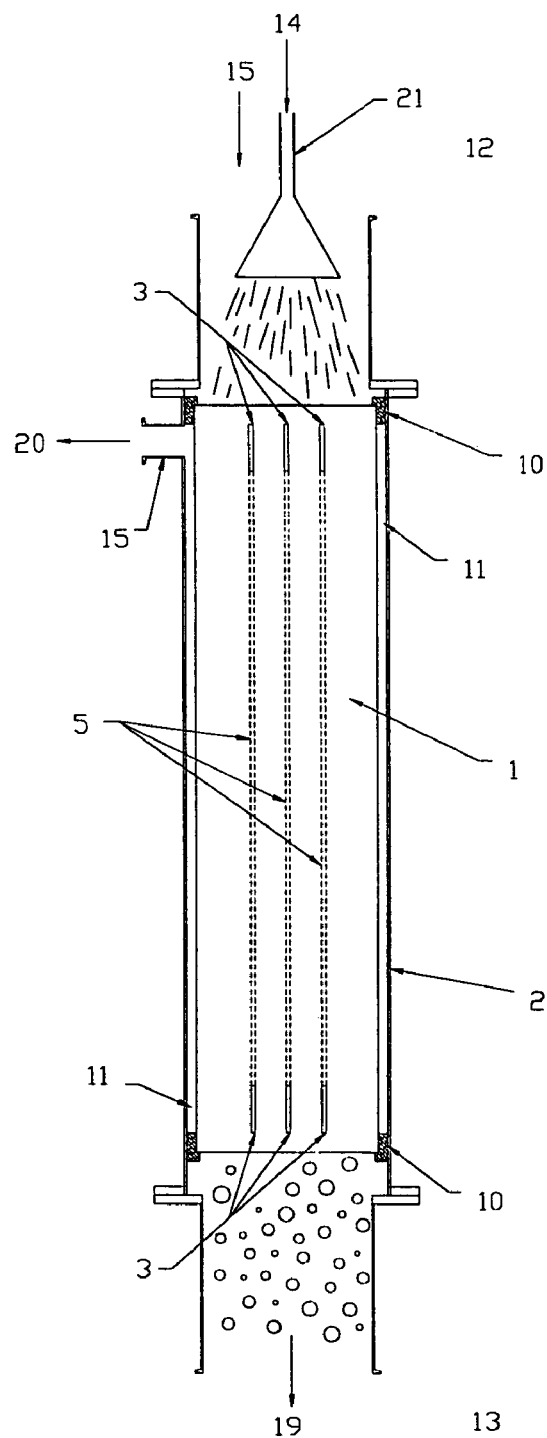
FIG. 2 is a schematic side view of a filtration apparatus and device according to this invention intended for operation in a downflow mode.

FIG. 2 shows an alternative vertically oriented apparatus with the gas-liquid flow in a downflow mode, rather than the upflow mode. The technique to be used is similar to that used at the University of Delft for monolith loop reactors, cited above. All numerically identified items with the same numbers as in FIG. 1 have the same function. In this downflow case, liquid flow 14 is introduced through a flow distributor 21 that disperses the liquid as droplets or streams into a continuous gas phase 15. This feed end of the filtration device 12 is located physically above the outlet end face of the device 13. The liquid falling down the passageways under gravity entrains gas, which also flows downward in slug flow. The gas-liquid mixed phase exits the apparatus at the bottom 19.

After the gas liquid mixture exits the apparatus at the outlet end, it normally would be separated into gas and liquid phases for internal recycle or discharge of either or both of the two phases. This applies to either the upflow or downflow modes of operation.

Further, the apparatus orientation can be vertical or off vertical. In addition, for a system in which the liquid feedstock is pumped and it may not be necessary to rely on buoyancy to provide the circulation, the apparatus could even be mounted horizontally with gas-liquid flow created by the pumped liquid feedstock and entrained gas.

For the examples shown in FIGS. 1 and 2, the filtrate collection zone is along the side of the filtration device. Alternatively, the filtrate can be withdrawn from one or both end faces of the filtration device using a filtrate conduit duct, as disclosed in U.S. Pat. No. 5,009,781.

For all of the above devices, very compact filters can be constructed. The monolith passageway wall area per unit volume of the monolith can be greater than about 150 square meters area per cubic meter of monolith volume. The hydraulic diameter of the passageways in the device is preferably in the range of about 2 mm to 15 mm. Table 1 shows how the monolith passageway wall area per unit monolith volume can vary as a function of the passageway hydraulic diameter.

TABLE 1

Passageway Wall Areas of Monolith Supports

Bases:

1. Square passageways
2. Monolith wall thickness of 35% of passageway hydraulic diameter

| Passageway Hydraulic Diameter, mm | Monolith Cell Density, passageways/sq cm | Wall Area/Volume, Sq m/cu m |
|---|---|---|
| 2 | 14.1 | 1,131 |
| 5 | 2.3 | 452 |
| 10 | 0.6 | 226 |
| 15 | 0.3 | 151 |

The monolith material can be ceramic, metallic, polymeric, or other suitable porous material. The porosity of the monolith support is generally in the range of about 30 to 70%. The mean pore size of the monolith support is preferably greater than about 3 microns. The filter elements can utilize a single unitary monolith structure or a multi-segment monolith structure, i.e., a monolith assembly. Individual monoliths will preferably have a hydraulic diameter in the range of about 5 cm to about 50 cm.

A membrane coating can be added to a filtration device to form a membrane device. The membrane types for which this invention is applicable include microfiltration (MF), ultrafiltration (UF), nanofiltration (NF), reverse osmosis (RO), and pervaporation. For MF and UF, the pore sizes of such membranes are preferably in the range from about 0.1 micron to 1 micron and 2 nanometers to 0.1 micron, respectively. Membrane materials can be ceramic, metallic, polymeric, or combinations thereof.

The volumetric fraction of gas flow in the total flow is important, as detailed in the above-cited technical references, e.g., Cui, et al., and Mercier/Mercier-Bonin, et al. The range of applicability is from about 10 vol % to 90 vol % gas, preferably in the range of about 30 vol % gas to 70 vol % gas.

Example 1

A slug flow membrane filter test loop for Fischer-Tropsch Slurry (FTS) catalyst/wax separation was assembled. A gas-lift membrane module was installed below a 200-liter heated feed tank. The membrane module was sparged at a bottom end face with nitrogen to create an upward flow, driven by buoyancy, and liquid from the feed tank was able to circulate to the inlet of the membrane module through a down comer leg. The total height of the two-phase fluid column from the gas inlet to the top of the column was approximately 120 cm. The membrane module assembly consisted of a CeraMem™ ceramic membrane element and a stainless steel housing. The membrane element had twelve 5-mm square feed passageways that were 308 mm long, resulting in a total membrane area of 0.073 m$^2$. The passageways were coated with a nominal 10-nm pore size $TiO_2$ UF membrane layer as the top layer in a multilayer membrane coating on a nominal 12-micron pore size, ca. 42% porosity recrystallized silicon carbide support.

The filtrate-handling loop, which was continuously purged with nitrogen, was used to collect filtrate samples and return filtrate to the filtration loop by applying a nitrogen overpressure. Permeate was injected back into the feed loop primarily both to maintain a constant feed volume and to backflush the membrane for flux maintenance A 40-kg sample of dark brown FTS catalyst/wax was obtained for testing. The sample was from a pilot plant producing FT wax and had been previously processed in a first stage gravity separator to remove coarse solids. The reported concentration of Fe-based catalyst "fines" in the sample was 1200 ppmw (as $Fe_2O_3$).

The gas lift membrane process was evaluated using, first, catalyst-free mineral oil at room temperature, and second the actual clarified FTS catalyst/wax slurry at elevated temperature.

The UF membrane element and the process system were initially tested using mineral oil. First, the membrane mineral oil flux was measured without gaslift using a peristaltic pump at room temperature. The measured flux, corrected for viscosity difference, was consistent with that measured for water. This "clean" mineral oil flux was used as a baseline for comparison to that measured after process testing and subsequent membrane cleaning in order to determine cleaning effectiveness.

Clarified FTS Catalyst/Wax Slurry at Elevated Temperature. Tests using the actual catalyst/wax slurry included evaluation of (1) the influence of temperature and transmembrane pressure during "differential" operation, (2) the effectiveness of flux maintenance procedures, and (3) system performance while conducting a batch concentration ("integral operation"). During differential operation, most of the wax filtrate was returned to the loop so that the catalyst concentration remained relatively constant throughout the test. During integral operation, filtrate was continuously removed from the system so that the catalyst concentration in the slurry increased with time.

Figure 3:
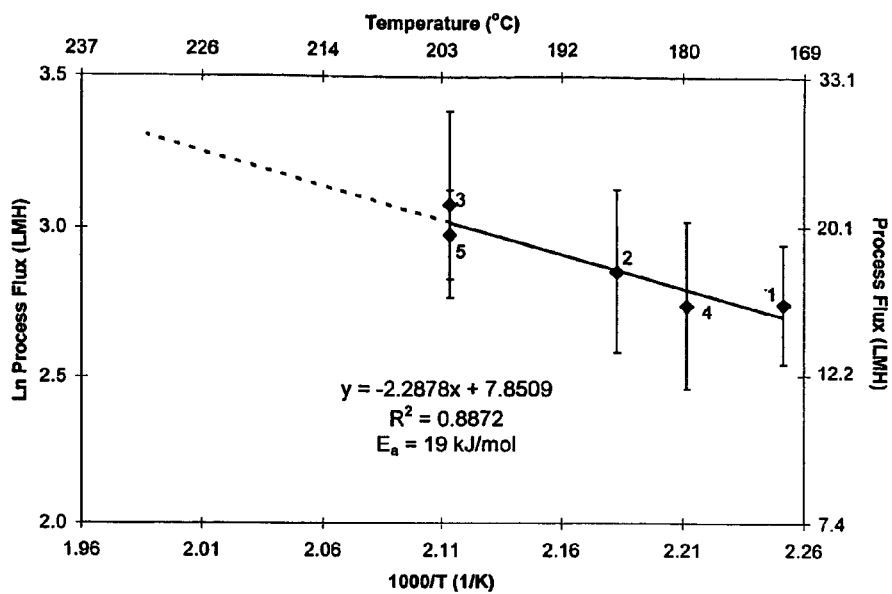
FIG. 3 shows data for a monolith-based membrane apparatus used to filter catalyst fines from a Fischer-Tropsch catalyst/wax slurry, the data showing the effect of temperature on filtration rate.

The Influence of Temperature during Differential Operation. 20 kg of the clarified catalyst/wax slurry were added to the test system. The wax temperature was varied at a fixed nitrogen flow through the membrane corresponding to a gas velocity of 1.3 m/s. The effect of temperature on process flux under these test conditions is shown in FIG. 3. The membrane flux increased from 15 to 21 liters/sq m-hr (lmh) as temperature was increased from 171° C. to 200° C., and there was little indication hysteresis was significant.

Figure 4:
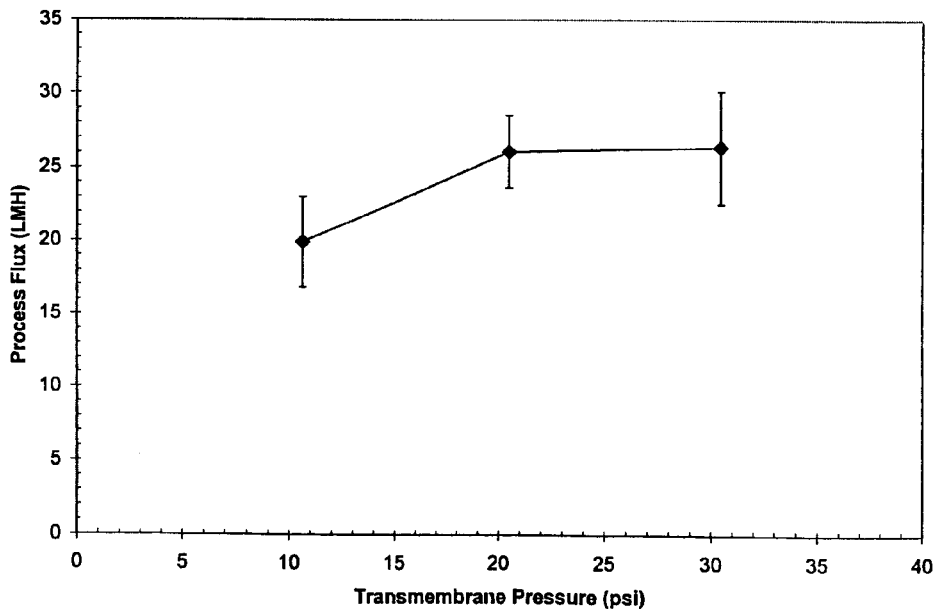
FIG. 4 shows data for a monolith-based membrane apparatus used to filter catalyst fines from a Fischer-Tropsch catalyst/wax slurry, the data showing the effect of transmembrane pressure on filtration rate.

The Influence of Transmembrane Pressure during Differential Operation. Experiments were conducted in which the transmembrane pressure was changed between 0.7 bar and 2.1 bar. Membrane flux as a function of transmembrane pressure at 200° C. at a nitrogen velocity of about 1.1 m/s is shown in FIG. 4.

Permeate Quality during Differential Operation. The iron contents of several wax feed and filtrate samples were determined through use of direct current plasma emission spectroscopy (Table 2).

TABLE 2

Fe contents of the clarified wax FT (denoted as "feed"), at two times during tests and filtrate samples corresponding to the latter.

| Sample | Process Conditions | | | Fe Content (ppmw)[a] |
|---|---|---|---|---|
| | T (° C.) | TMP (bar) | Gas Velocity (m/s) | |
| Clarified Wax (as-received) | — | — | — | 640 |
| Feed | 186 | 0.7 | 1.3 | 606 |
| Permeate | 179 | 0.7 | 1.3 | 20 |
| Feed | 199 | 2.1 | 1.0 | 510 |
| Permeate | 199 | 2.1 | 1.0 | 31 |

[a]Fe content refers to elemental iron as measured by direct current plasma emission spectroscopy. Multiply values by 1.43 to convert to a $Fe_2O_3$ basis.

The set of feed and filtrate samples at 0.7 bar TMP was obtained after 2.5 h of operation, whereas the set of samples at 1.3 bar TMP was obtained after about 9 h. The iron concentration in the filtrate samples was reduced significantly, indicating the separation efficacy of the UF membrane module.

Influence of Flux Maintenance Techniques during Integral Operation. Tests were conducted to evaluate the effect of membrane backpulsing with filtrate to maintain flux. Permeate backpulsing at a negative transmembrane pressure of 1.7 bar for a duration of 2 sec every 5 to 15 minutes was found to be especially effective in maintaining a relatively high and stable membrane flux.

Figure 5:
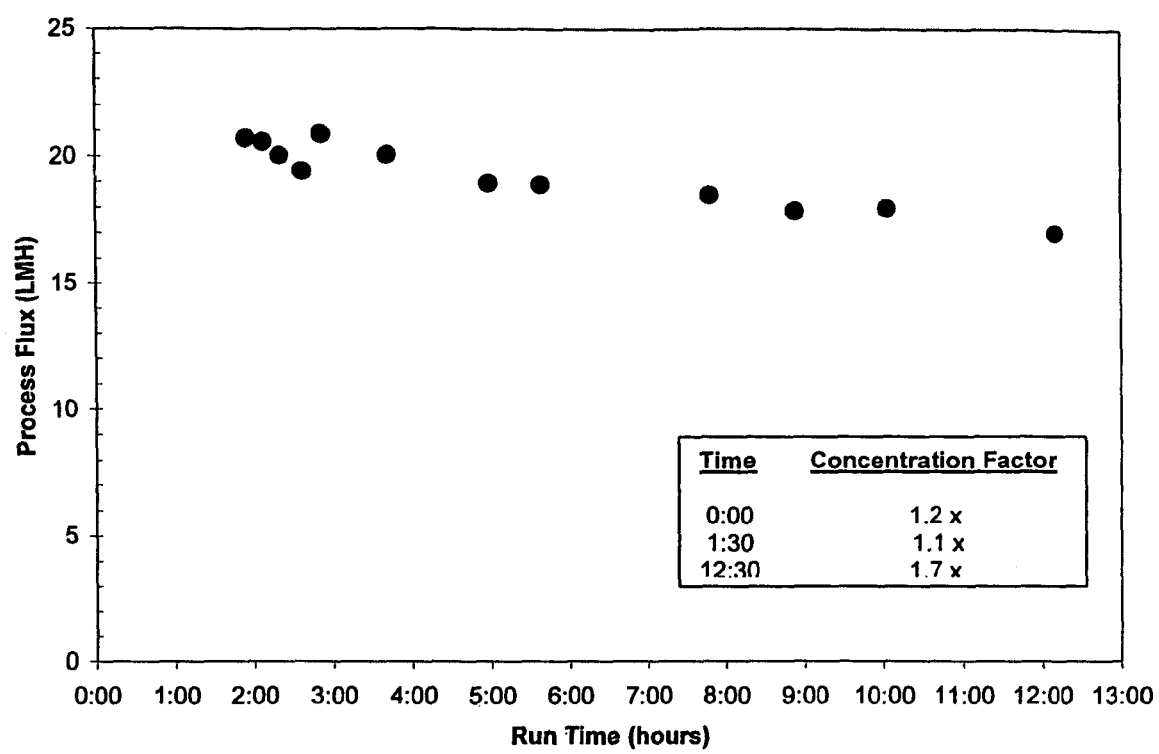
FIG. 5 shows data for a monolith-based membrane apparatus used to filter catalyst fines from a Fischer-Tropsch catalyst/wax slurry, the data showing the effect of time and feed concentration factor on filtration rate.

System Performance while Operating as a Batch, Integral Process. A "batch concentration" run was performed in which filtrate was withdrawn from the system and not recycled to the feed tank. During the batch concentration, membrane flux decreased slowly as the feed solids concentration increased (FIG. 5). At the end of this test, the flux was about 17 lmh and the estimated concentration factor for the feed was 1.7-fold.

The membrane element was removed from its housing after the system had cooled to room temperature. The element was then soaked for several hours in 105° C. mineral oil to dissolve wax that had solidified within the membrane element pores during cooling and remove material that had deposited on the membrane surface. After draining the discolored mineral oil, a clean mineral oil flux was measured at room temperature with a peristaltic pump. The flux was about 70% of the initial measured baseline flux, indicating that the membrane was substantially cleaned by this simple procedure.

The results of this example illustrate that a gas-lift membrane process can provide a relatively high (for this feed material) and stable membrane flux. This is attributed to the liquid flow induced through the membrane element by gas-lift with nitrogen.

Example 2

In this example, a membrane bioreactor was tested in a university setting, using sanitary wastewater taken from the university's wastewater treatment facility. The test system consisted of a biological oxidation tank with a hydraulic residence time (HRT) of about 4 hrs and a mixed liquor suspended solids (MLSS) level of about 10 g/l. Two membrane types were tested. First was an X-Flow (Enschede, NL) multi-tubular polymeric membrane module. The module contained seven (7) tubular elements, each with an 8 mm i.d., potted into a tubular bundle of 1000 mm length. The membrane pore size was nominally 0.03 micron. The second was a CeraMem membrane element. The monolith element contained 9 square passageways, each 5 mm on a side. The length of the test element was 346 mm, and the nominal membrane pore size the $\alpha$-alumina MF membrane was 0.1 micron. The porous monolith support was the same as that used in Example 1.

Tests were conducted in an external airlift configuration, in which the feed side of the membrane modules was atmospheric and a negative pressure was pulled on the filtrate side by using a peristaltic pump to extract filtrate at a constant flow rate (constant membrane flux). Liquid and gas flow rates were measured with flowmeters or, for the retentate, by temporarily diverting flow into a measuring cylinder. "Critical flux" was determined as the highest flux level at which the permeability was at least 90% of the stable, low-flux permeability.

Figure 6:
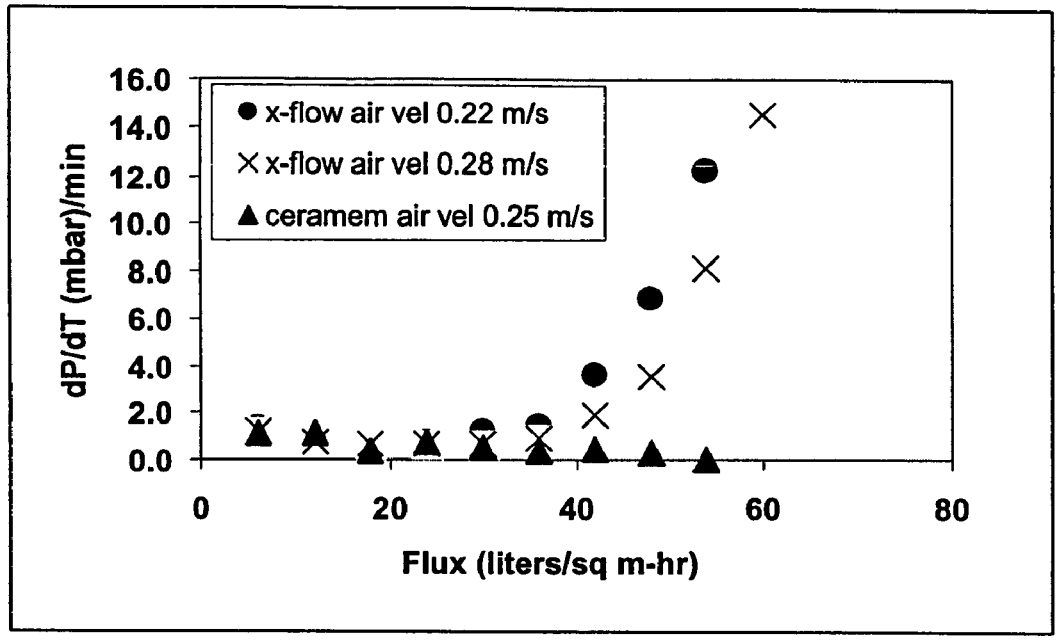
FIG. 6 shows data for a monolith-based membrane apparatus and device used in an airlift membrane bioreactor to filter biomass, the data showing comparative fouling rates as a function of filtration rate for the device and a competitive polymeric multi-tubular membrane module.
Figure 7:
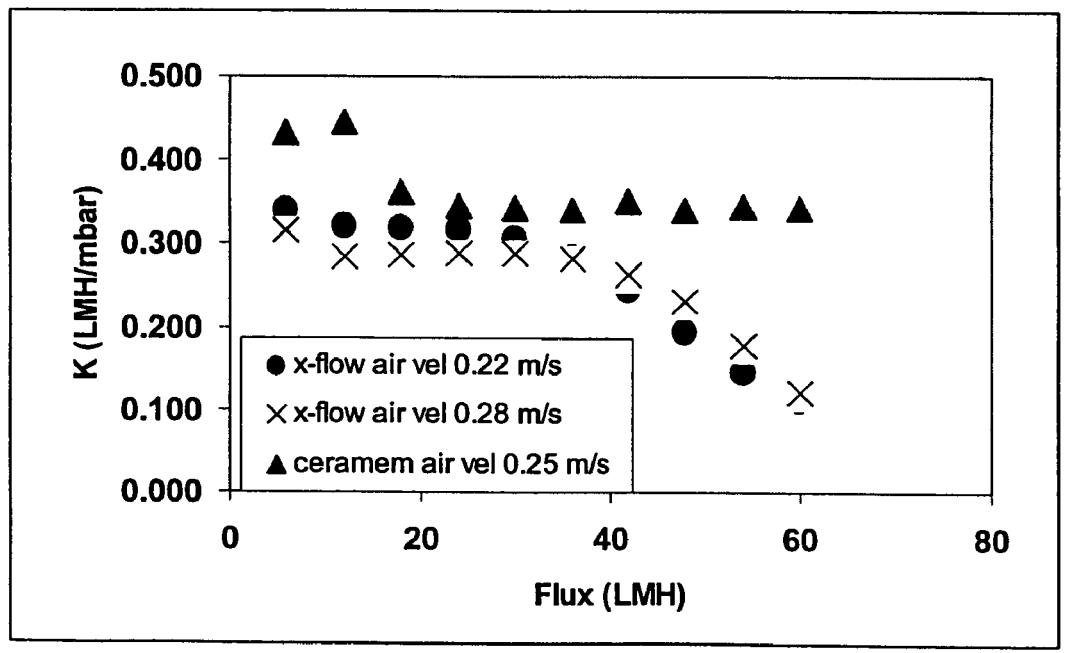
FIG. 7 shows data for a monolith-based membrane apparatus and device used in an airlift membrane bioreactor to filter biomass, the data showing membrane permeability as a function of filtration rate for the device and a competitive polymeric multi-tubular membrane module.

Operating at the same airlift velocity of 0.25 m/sec, the CeraMem ceramic membrane showed markedly superior performance. This is seen in FIG. 6, which shows membrane permeability vs. imposed membrane flux level. The polymeric membrane showed fouling starting at a critical flux level of about 30 lmh, which is typical for tubular polymeric membranes under these operating conditions. In contrast, the ceramic membrane showed no fouling up to an imposed flux level of 60 lmh, the limit achievable in the test system. Throughout this range, the fouling rate (abscissa in FIG. 6) was constant at about 0.5 mbar/min. FIG. 7 shows analogous permeability data for the modules and indicates that the ceramic monolith module exhibited no significant loss in permeability of the level of flux imposed, up to 60 lmh. This indicates that the fouling observed for the polymeric membrane was absent for the ceramic membrane.

Also, an unexpected result was the higher amount of liquid entrained by the ceramic monolith with square passageways. The ratio of air/total flow at 0.25 m/sec was 0.35 for the ceramic monolith membrane element vs. about 0.60 for the tubular polymeric membranes. This may be due to the smaller passageway of the ceramic membrane element.

Under the most highly fouling conditions of the critical flux step experiment, the square-channel ceramic membrane did not foul, whereas, the polymeric tubular membrane displayed the expected exponential relationship between fouling rate and flux, as has been reported in various previous testing (P. Le Clech, et al, "Critical Flux Determination by the Flux-Step Method in Submerged Membrane Bioreactor", J. Mem. Sci., 227 (1-2) 81-93 (2003).

Other embodiments will occur to those skilled in the art and are within the following claims:

What is claimed:

1. A method for separating a liquid feedstock in a membrane apparatus into a permeate and gas-containing retentate which method comprises:
   (a) providing a membrane device for receiving a liquid feedstock and a gas and for separating the feedstock into a permeate and a gas-containing retenetate, the membrane device comprising:
   at least one monolith of porous material, the monolith containing a plurality of feedstock passageways extending longitudinally from a feed end face to a retentate end face of the monolith and defining passageway hydraulic diameters, through which the liquid feedstock and gas flow to pass the gas-containing retentate from the device;
   the porous material of the monolith having a porosity of at least 30% and a mean pore size of at least 3 microns;
   a permselective membrane of a pore size smaller than that of the porous material, the permselective applied to the feedstock passageway wall surfaces of the monolith, the permselective membrane selected from the group consisting of membranes suitable for microfiltration, ultrafiltration, nanofiltration, reverse osmosis or pervaporation;
   at least one permeate conduit within the device, the permeate conduit isolated from the feed and retentate end faces, for carrying permeate toward a permeate collection zone external to the device, the permeate conduit providing a path of lower flow resistance than that of alternative flow paths through the porous material;
   at least one inlet to the device for introduction of the feedstock and the gas to the feed end face of the device;
   at least one outlet from the device for withdrawal of the gas-containing retentate from the retentate end face of the device; and
   at least one seal to separate the feedstock and the gas-containing retentate from the permeate collection zone;
   (b) introducing a liquid feedstock and a gas into the feed end face of the device, the gas comprising relatively coarse bubbles, at least some of which are larger than the monolith passageway hydraulic diameters;
   (c) using the feed end face of the device to break up the larger bubbles into smaller bubbles that enter the feedstock passageways along with the liquid feedstock in a gas-liquid flow constrained within the feedstock passageways for separation into filtrate and gas-containing retentate;
   (d) flowing at least a portion of the permeate through the permeate conduit toward the external permeate collection zone;
   (e) collecting the permeate in the permeate collection zone and removing the permeate from the device; and
   (f) removing the gas-containing retentate from the retentate end face of the device.

2. The method of claim 1 in which the surface area of the monolith passageway wall surfaces is at least 150 square meters per cubic meter of the monolith.

3. The method of claim 1 in which the porous material of the monolith device is a ceramic.

4. The method of claim 3 in which the ceramic is selected from the group consisting of cordierite, alumina, mullite, silica, zirconia, titania, spinel, silicon carbide, silicon nitride, and mixtures thereof.

5. The method of claim 1 in which the membrane device is comprised of a single monolith.

6. The method of claim 1 in which the membrane device is comprised of a monolith assembly.

7. The method of claim 1 comprising a housing in which the membrane device is contained for permeate collection, and the permeate collection zone is the annular space between the membrane device and the housing.

8. The method of claim 1 in which the monolith is sealed along its exterior surface and the permeate is withdrawn from at least one end face of the membrane device.

9. The method of claim 1 in which the membrane device is oriented vertically and the inlet is at the bottom of the apparatus.

10. The method of claim 1 in which the membrane device is oriented vertically and the inlet is at the top of the apparatus.

11. The method of claim 1 in which the membrane is a microfiltration membrane with a pore size from about 0.1 to about 1 micron.

12. The method of claim 1 in which the membrane is an ultrafiltration membrane with a pore size from about 2 nm to about 0.1 micron.

13. A method of separating a liquid feedstock into a permeate and a gas-containing retentate, the method comprising:
   a. mixing the liquid feedstock and a gas to form a gas/liquid feedstock mixture;
   b. directing the gas/liquid feedstock mixture into a plurality of channels extending longitudinally through a porous monolith;
   c. moving the gas/liquid feedstock mixture through the plurality of channels of the porous monolith;
   d. as the gas/liquid feedstock mixture moves through the channels of the porous monolith, driving at least a portion of the liquid feedstock through a permselective membrane applied to the walls of the channels to produce a permeate, leaving in the channels gas-containing retentate; and
   e. removing the gas-containing retentate from the channels of the porous monolith by directing the gas-containing retentate from the porous monolith;

f. wherein the gas includes coarse bubbles, at least some of which are larger than the cross sectional areas of the channels, and the method includes impacting the bubbles against a feed end face of the monolith and breaking the bubbles into smaller bubbles that are then directed into the channels.

14. The method of claim 13 including backpulsing to clean the permselective membrane.

15. The method of claim 13 including permeate backpulsing at a negative transmembrane pressure from time-to-time for a selected time period.

16. The method of claim 15 including permeate backpulsing at a negative transmembrane pressure of approximately 1.7 bar for a duration of approximately 2 seconds approximately every 5 to 15 minutes.

17. The method of claim 13 including directing the gas/liquid feedstock mixture through a plurality of channels that are non-circular in cross section.

18. The method of claim 17 wherein the channels are generally rectangular in cross section.

19. The method of claim 13 wherein the porous material of the monolith is a ceramic.

20. The method of claim 13 including intermittently flowing a fluid from a permeate side of the membrane to a feed side of the membrane in order to remove feed materials from the permselective membrane.

21. The method of claim 13 including intermittently flowing the permeate from a permeate side of the membrane to a feed side of the membrane in order to remove feed materials from the permselective membrane.

22. The method of claim 18 wherein the channels are generally square in cross section.

* * * * *